(No Model.)

E. T. STARR.
SECONDARY BATTERY.

No. 283,295. Patented Aug. 14, 1883.

WITNESSES
Wm A. Skinkle
F. D. Shoemaker

INVENTOR
Eli T. Starr,
By his Attorneys
Baldwin, Hopkins & Peyton

UNITED STATES PATENT OFFICE.

ELI T. STARR, OF PHILADELPHIA, PA., ASSIGNOR OF ONE-HALF TO WILLIAM J. PEYTON, OF WASHINGTON, D. C., AND H. M. LEWIS AND JAMES W. WHITE, OF PHILADELPHIA, PA.

SECONDARY BATTERY.

SPECIFICATION forming part of Letters Patent No. 283,295, dated August 14, 1883.

Application filed November 28, 1882. (No model.)

*To all whom it may concern:*

Be it known that I, ELI T. STARR, of the city and county of Philadelphia, in the State of Pennsylvania, have invented certain new and useful Improvements in Secondary Batteries, of which the following is a specification.

My invention relates more especially to electric batteries of that class which generate no electricity of themselves, but which, when submitted to the action of an electric current from a suitable generator passing through the battery, become charged or put into condition to give off electric currents or energy upon connecting the poles of the battery by a conductor.

The object of my invention is more particularly to improve secondary battery elements by imparting to them greater lightness, and by constructing them in a more economical manner, while producing elements capable of large storage capacity within comparatively small space.

The subject-matter claimed herein as my invention is first specifically described in detail and then particularly pointed out at the close of the specification.

Figure 1:
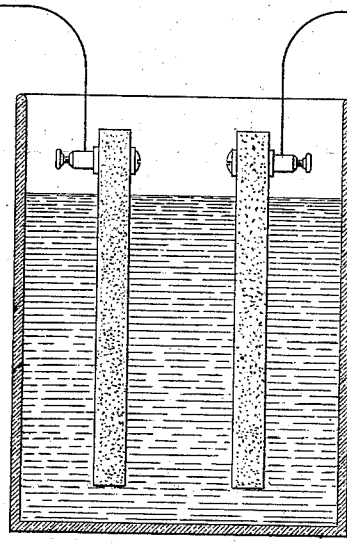
Figure 2:
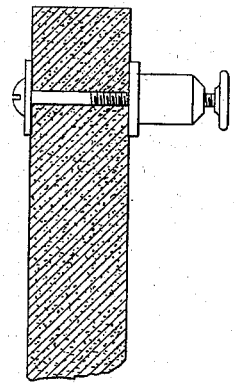

In the accompanying drawings, Figure 1 is a view in section of a secondary battery embodying elements or electrodes constructed according to my invention; and Fig. 2 is a section through one of such elements, showing one way of connecting the elements of the battery with the wires of the charging or working circuits thereof.

Heretofore the electrodes of secondary batteries have been constructed in various ways. The electrodes of the Planté type of battery consist of metal plates with their surfaces "formed" or rendered porous by electro-chemical action, so as to be capable of readily accumulating the energy of the charging-current. In the Percival type of battery the electrodes are composed of a mass of porous material supported by the sides of the battery-vessel, and divided by a partition or diaphragm, while in the Faure type of battery the electrodes consist of metal plates or supports to which are applied layers of porous active material—such, for instance, as oxide of lead. The Faure type of secondary battery is very efficacious by reason of the employment of the oxide or finely-divided lead. Leclanché, also, has constructed electrodes by mixing pulverized carbon with a metallic salt or compound and with an adhesive binding agent, and then subjecting the mixture to very heavy hydraulic pressure in molds, and during the process of compression has submitted the mixture to a temperature of about 100° centigrade. The result is a highly compressed, solid, and heavy electrode, rendered self-sustaining by compression. Electrodes for batteries have also been constructed by mixing pulverized carbon with a binding agent, the mixture being carbonized in suitable molds.

My present improvement is an electrode for electric batteries, consisting of a mixture of finely-divided metal or metallic compound with a binding agent baked to carbonization, so as to embrace the metallic matter or compound and convert the mixture into a porous self-sustaining body of good conductivity. Such an electrode is very porous, comparatively light and strong, very efficient by reason of the metallic matter, has good conductivity, and is economically made.

In carrying out my invention various compositions may be used to form the electrodes, and the shape they may be made to assume may also be varied.

A secondary battery electrode or element, embodying my invention, may be constructed as follows: Mix oxide (preferably peroxide) of lead with coal-tar and molasses to the consistency of a paste, and then saturate or thoroughly coat fibrous material—for instance, cotton fiber—with said paste. Then coat the mass thus constituted with a paste or plastic composition composed of pulverized carbon or clay, oxide of lead, coal-tar, and molasses, the latter paste having first had its constituents thoroughly mixed or commingled together. The plastic mass or composition of matter thus constituted is molded or shaped into the desired form by suitable molds under pressure, if preferred, and is then placed in a kiln or furnace (in an air-tight mold, if desired) and subjected to the action of heat, or baked or burned sufficiently to carbonize the molasses and tar, and until the mass is hardened and given a fixed shape, so as to be self-sustaining.

The molasses and tar, or their equivalent, enable the composition to be rendered plastic or put into condition to be readily shaped or molded, and also act to bind the materials together, and when heated or burned in a kiln are converted into carbon and act as a conductor in addition to their binding action. The fiber of the mass, by the action of the kiln or furnace, also becomes carbonized, and constitutes what may be called "conductors" through the whole mass of the element or electrode, in order to conduct the charging-current throughout the entire mass, so as to enable the accumulating forces to act with the greatest effect upon the electrode in order to place it in condition, when assembled in the battery, to give forth electric energy. The carbon or clay acts, when heated or baked, as a stiffening or binding but porous agent. The oxide of the composition electrode is the chief active agent. Of course, any suitable equivalent active matter, metal, or metallic compound or compounds may be substituted for the oxide of lead. The proportions of the ingredients or constituents of the composition above described may be so greatly modified that I deem it unnecessary to particularize exact proportions for any of the constituents of the composition; twenty-five parts of oxide of lead, sixty parts of pulverized carbon, ten parts of molasses and tar, (equal proportions,) and five parts of fiber, in bulk, may, however, be employed with good effect. The greater the quantity of oxide or active agent used in proportion to the molasses, tar, fiber, and carbon or clay, the greater will be the capacity of the electrode as an accumulator of energy.

The above is one way by which a composition of matter embodying oxide of lead or other active matter, or matter to be made active, as a constituent, may be formed by baking or burning (or more properly by the action of heat) into a porous self-sustaining electrode for secondary batteries capable of accumulating a large amount of energy from a charging-current. I prefer the elements to be in the form of flat plates; but, as before stated, the elements may have different shapes.

In order to afford a ready means of connecting the circuit connections or wires, whether of the charging or working circuit of the battery, with the porous composition electrodes when assembled in the battery-vessel, and immersed, for instance, in dilute sulphuric acid, I preferably drill a hole into the upper end of the porous body and fasten the wires by means of a binding-screw fitted into said hole, as clearly shown in Fig. 2. It will be obvious, however, that the shape of the electrodes may be such as to afford ready means of connecting the wires either with or without binding screws or bolts, and that the connections may be made in various well-known ways.

This application is a division of my application filed July 24, 1882, in favor of which I hereby disclaim any and all patentable subject-matter of my invention, save that specifically recited in the following claim.

What I claim herein as of my invention is—

An electrode for electric batteries, consisting of a mixture of finely-divided metallic matter or compound, with a binding agent baked to carbonization, so as to embrace said metallic matter and convert the electrode into a porous self-supporting body, substantially as described.

In testimony whereof I have hereunto subscribed my name this 30th day of September, A. D. 1882.

ELI T. STARR.

Witnesses:
Wm. J. Peyton,
E. Eugene Starr.